United States Patent [19]
Alling

[11] 3,785,710
[45] Jan. 15, 1974

[54] SEPARATOR INSERT FOR THRUST BEARINGS
[75] Inventor: Richard L. Alling, Torrington, Conn.
[73] Assignee: The Torrington Company, Torrington, Conn.
[22] Filed: Oct. 30, 1972
[21] Appl. No.: 301,771

Related U.S. Application Data
[63] Continuation-in-part of Ser. No. 218,159, Jan. 17, 1972.

[52] U.S. Cl. ............................................... 308/235
[51] Int. Cl. ............................................. F16c 33/58
[58] Field of Search ............... 29/148 C; 308/235, 308/234

[56] References Cited
UNITED STATES PATENTS
1,169,881  2/1916  Sorensen ........................ 308/215
2,978,282  4/1961  Fisher ............................. 308/215

Primary Examiner—Manuel A. Antonakas
Assistant Examiner—Frank Susko

[57] ABSTRACT

A thrust bearing separator insert is claimed which reduces wear due to inertial forces in high speed bearings, and prevents wedging of retainer halves in high thrust applications.

3 Claims, 11 Drawing Figures

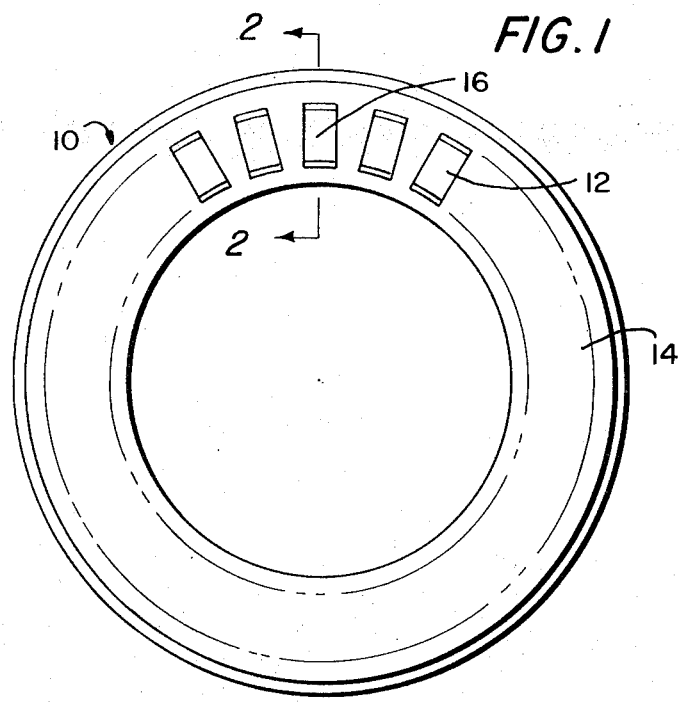
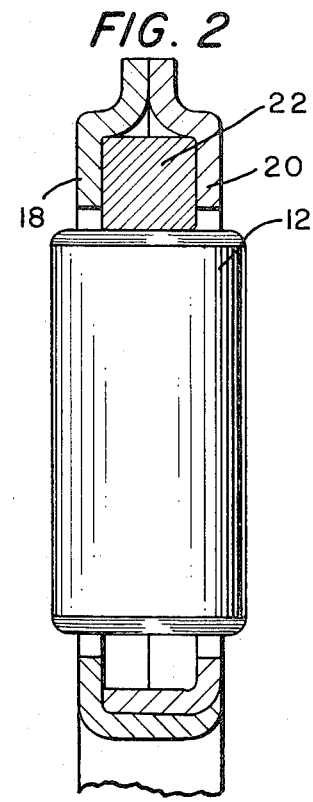
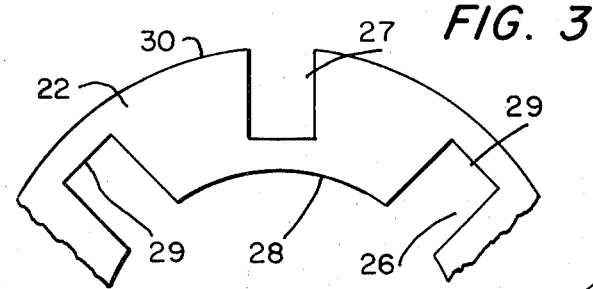
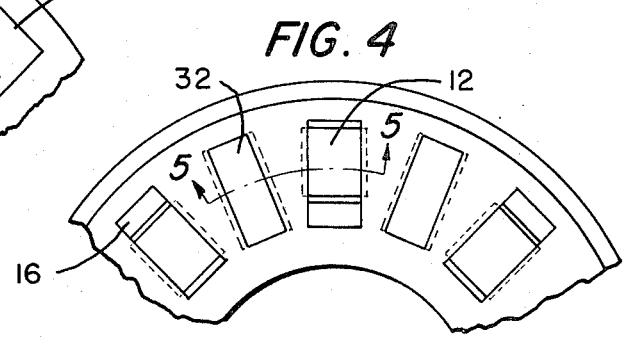
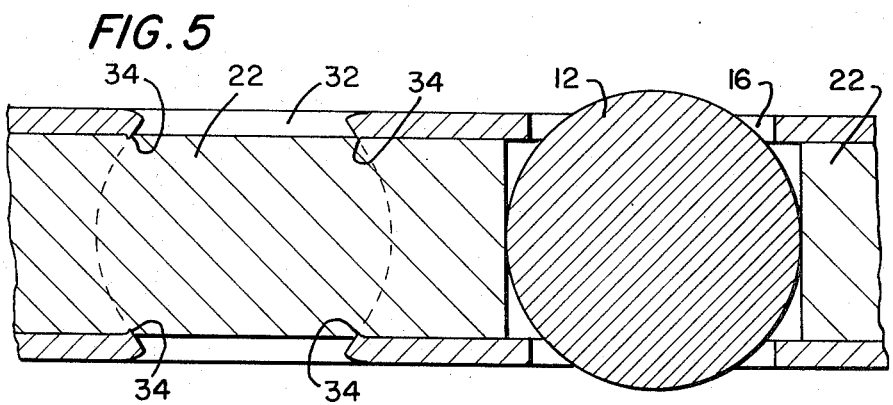

SEPARATOR INSERT FOR THRUST BEARINGS

This is a continuation-in-part of application Ser. No. 218,159, filed Jan. 17, 1972.

This invention relates to a thrust bearing assembly. More particularly, this invention is a new and improved thrust bearing separator insert wherein radial inertial thrust is absorbed by the insert and undue wear of the retainer body is prevented. Further, circumferential skewing is controlled to prevent wedging apart of the retainer halves.

The basic thrust bearing assembly generally comprises roller members captured between two retainer halves. In high speed applications, the inertial forces press the outboard end of the roller members against the pocket edges of the retainer halves. The rapidly turning roller member operates as a grinding wheel against the thin sections of the retainer halves, and frequently wears the pockets to such a degree that the filings damage the rest of the bearing or bearing operation is noisy and hot. Rollers have been known to grind completely through the end of a retainer.

In slower speed, high thrust, marginal lubrication applications the axes of the roller members tend to skew so that the rollers wedge between the retainer halves. This results at best, in increased frictional drag on the bearing, and at worst, in wedging of the roller members between the retainer halves causing destruction of the bearing assembly. The bearing retainer must impart significant guiding forces to the rolling members to maintain the radial positioning of the roller axes. My invention solves these problems by introducing a separator insert between the retainer halves to provide high guidance forces to the rollers and to significantly improve performance in marginal lubrication situations.

The invention as well as its many advantages may be further understood by reference to the following detailed description and drawings in which:

FIG. 1 is a plan view of a needle thrust bearing;

FIG. 2 is a partial section of a bearing with a separator insert;

FIG. 3 is a partial view of one embodiment of the insert;

FIG. 4 is a partial plan view of a thrust bearing with alternate pockets vacant;

FIG. 5 is a partial section of the bearing in FIG. 4 taken along line 5—5;

Like parts throughout the various views are referred to by like numbers.

DESCRIPTION OF THE INVENTION

Figure 6:
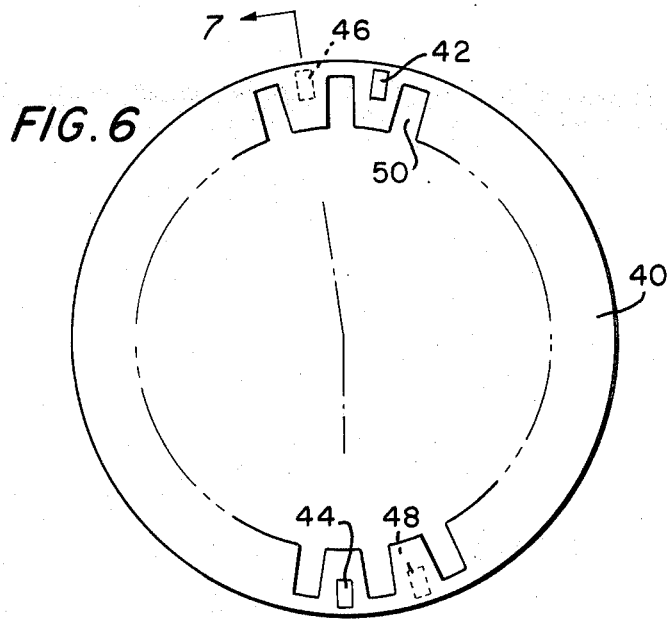
FIG. 6 is a plan view of a modified separator insert.
Figure 7:
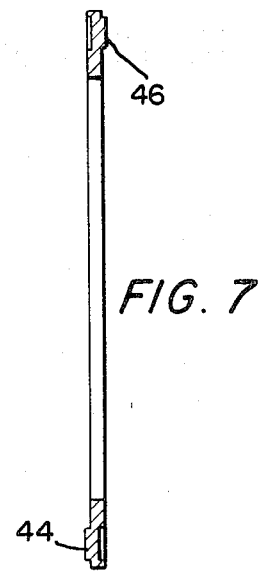
FIG. 7 is a sectional view taken along line 7—7 of FIG. 6.

In a needle thrust bearing generally indicated by 10 in FIG. 1, roller members 12 are held in position by a retainer 14 with uniformly-spaced pockets 16. Partial section, FIG. 2, shows the retainer comprises an inner half 18 and an outer half 20. The separator insert 22 may comprise an annular ring against which the outboard end of each roller member will bear. By absorbing the inertial force of the roller in a high speed bearing, the insert reduces stresses at the outer end of the pockets which otherwise may be worn away during a short period of service. Under slow speed, high thrust service conditions, the embodiment shown in FIG. 3 has advantages. Radial slots 26 are pierced from the bore 28. Alternate radial slots 27 are pierced from the outer diameter 30 of the insert 22. The radial slots 26 and 27 have a width greater than that of the pockets 16 which prevent escape of the roller members 12 as can be readily seen in FIGS. 4 and 5. The radial outer edge 29 of each of the pockets 26 is closer to the common axis of the retainer and the separator insert than the radial outer edges of the pockets in the retainer. Alternate pockets 32 may be left vacant and circumferential slippage between the retainer halves and insert prevented by stakes 34 at the empty pockets. If bearing size permits, vacant pockets will not be required and slippage can be prevented by spot welding the retainer halves to the separator.

FIG. 6 shows a second embodiment of separator insert. The annular separator insert 40 has protrusions 42 and 44 on one side, and protrusions 46 and 48 on the other side. Each protrusion is adapted to extend into a vacant pocket in one of the retainer halves to control circumferential slippage. The insert 40 is provided with slots 50 which extend only from the inner bore.

Figure 9:
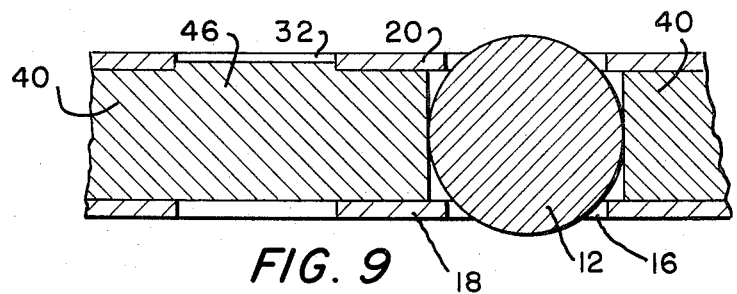
FIG. 9 is a sectional view similar to FIG. 5 showing the separator insert of FIG. 6 in a bearing assembly.

As shown in FIG. 9, when the annular separator insert 40 is assembled within the retainer halves 18 and 20, the protrusions, such as protrusion 46, extend into a pocket, such as pocket 32 of the retainer half 20. This arrangement effectively prevents circumferential slippage of the annular separator insert with respect to the retainer halves.

Figure 10:
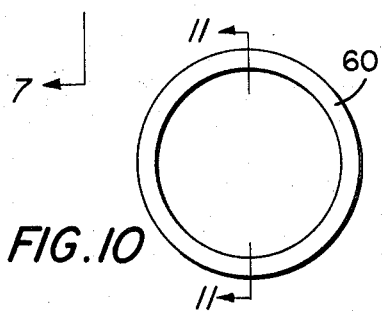
FIG. 10 is a plan view of another modified insert.
Figure 11:
FIG. 11 is a sectional view taken along line 10-10 of FIG. 10.
Figure 8:
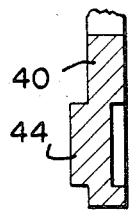
FIG. 8 is a fragmentary view of FIG. 7, on an enlarged scale.

For certain high speed operations, the simple annular member 60 of FIGS. 10 and 11 may be used as the insert. The roller members outer ends bear against the inner edge of the annular member 60.

In operation, the roller member 12 is prevented from escaping by the retainer halves 18 and 20. The separator insert provides rigidity and strength to the assembly and increases the bearing area at the outboard end of the roller members, thereby absorbing the inertial force of the rollers preventing wear on the retainer halves and consequent damage to the assembly. By guiding the longitudinal faces of the roller members, the separator controls the skewing of the roller axis and prevents a wedging action of the roller between the retainer halves which tends to separate them and increase friction in high thrust applications. Separation of the rollers from the radial edges of the pockets further facilitates lubrication of the bearing.

I claim:

1. In a bearing assembly having roller members and roller retainer halves comprising annular members with inner and outer peripheries and roller pockets, the retainer halves being adjacent at their inner and outer peripheries and their pockets in circumferential alignment, the improvement comprising: an annular member positioned between the retainer halves, the annular member having an inside diameter less than the outside diameter of each of the outer edges of the pockets in each of the retainer halves, whereby the annular member provides a roller members outer ends bearing area and said annular member has at least one protrusion on at least one side, the protrusion extending into one of the roller pockets in one of the retainer halves thereby controlling circumferential slippage.

2. The improvement of claim 1 wherein the annular member has at least one protrusion extending from each side, the protrusion on one side extending into a vacant roller pocket in one retainer half, and the protrusion on the other side extending into a vacant roller pocket on the other retainer half.

3. A bearing assembly comprising: an annular retainer having a plurality of rolling member pockets; an annular insert located in the annular retainer and adapted to provide bearings areas for rolling members; said bearing areas being closer to the common axis of the retainer and the insert than the radial outer edge of the pockets in the retainer; and at least one protrusion extending from at least one side of the annular insert into a vacant rolling member pocket of the retainer to prevent circumferential slippage.

* * * * *